Nov. 10, 1925.
W. A. LORENZ
1,561,335
AIRPLANE FRAMEWORK AND METHOD OF MAKING THE SAME
Filed April 20, 1921
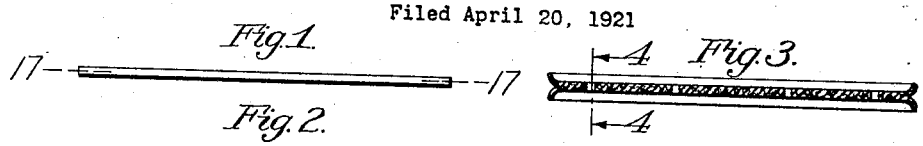
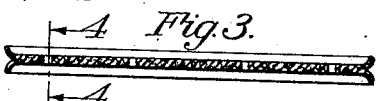
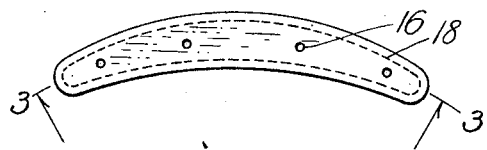
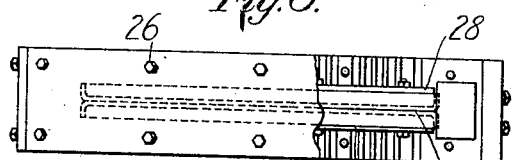
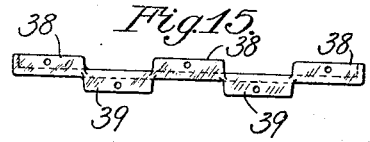
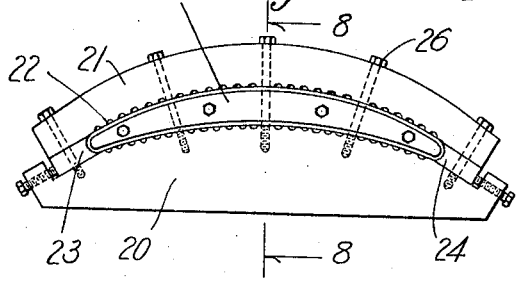
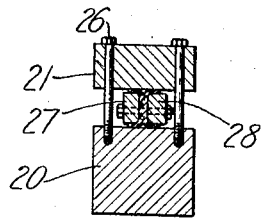
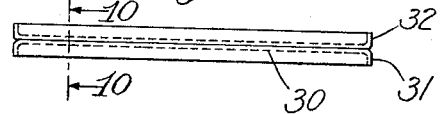
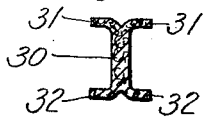
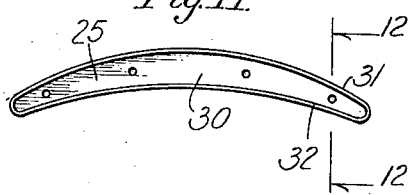
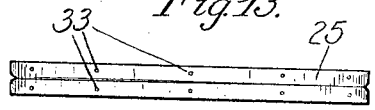
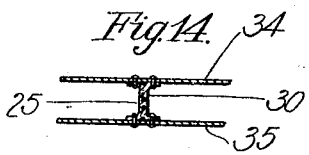
Inventor.
William A. Lorenz Patented Nov. 10, 1925.

1,561,335

UNITED STATES PATENT OFFICE.

WILLIAM A. LORENZ, OF HARTFORD, CONNECTICUT.

AIRPLANE FRAMEWORK AND METHOD OF MAKING THE SAME.

Application filed April 20, 1921. Serial No. 462,796.

*To all whom it may concern:*

Be it known that I, WILLIAM A. LORENZ, a citizen of the United States, residing at Hartford, in the county of Hartford and State of Connecticut, have invented new and useful Improvements in Airplane Framework and Methods of Making the Same, of which the following is a specification.

This invention consists of an improvement in structural articles, such as beams, struts, girders, which are especially adapted for airplanes and method of making the same. These are made from vulcanized fiber, or similar material, and when completed form framework structures which are strong and light.

In the drawings Fig. 1 represents an edge view and Fig. 2 a side view of a block of vulcanized fiber, which is to be formed into a framework structure. Fig. 3 shows a cross section on line 3—3 of Fig. 2, after the edges of the girder have been turned over. Fig. 4 shows a view on the line 4—4 of Fig. 3, the edges being partly bent over. Fig. 5 shows the same with the edges fully bent over. Figs. 6 and 7 show plan and side views of an apparatus for bending the edges of the framework over and holding it while drying.

Fig. 8 shows a sectional view of the drying fixture on the line 8—8 of Fig. 7. Fig. 9 shows a plan view of the framework, after drying. Fig. 10 shows a cross section on the line 10—10 of Fig. 9, enlarged. Fig. 11 shows the completed framework of Fig. 9 in side view. Fig. 12 shows a sectional view on the line 12—12 in Fig. 11. Fig. 13 shows a plan view of Fig. 11, and Fig. 14 shows the framework of Fig. 5, riveted to two pieces of material. Fig. 15 shows a modification of the framework.

A block of vulcanized fiber shown in Figs. 1 and 2, is cut to shape while soft. Holes may be punched as at 16 through the material.

17—17, Fig. 1, indicates where the framework is to be split around its edges, as far as the line 18 of Fig. 2.

The edges are first partly bent outwardly as in Figs. 3 and 4, and are fully bent outwardly as in Fig. 5 while the material is soft. In this position the framework is held and dried in a fixture illustrated in Figs. 6 and 7.

In those figures 20 represents a base piece; 21 a top piece conforming to the shape of the framework 25. The base 20 and top piece 21 may be grooved as at 22, where the pieces contact with the framework 25. End pieces 23 and 24 are secured against the ends of the framework 25, and bolts 26 may be employed to clamp the top piece to the base, thus holding the framework 25 in position to be dried. Clamping blocks fitting between the flanges of the framework 25 may be employed, as at 27 and 28, and bolts may be employed to clamp these two blocks together so as to hold the framework in position while being dried. The framework 25 itself is shown in section in Fig. 8 clamped between the various parts referred to.

Figs. 9, 11 and 13 show the dried framework, having the central portion 30, and outwardly turned flanges 31 and 32.

Holes may be formed in the flanges of this framework, as at 33—33, Fig. 13, so that it may be riveted to other pieces 34 and 35 of a plane, as in Fig. 14.

The edges 38, Fig. 15, may be turned over, first on one side, as at 38, and then on the other side, as at 39, thus alternating the bending of the edges, to form flanges.

Various modifications may be made in articles of this kind, such as I beams, struts, girders, or for other purposes, which are particularly useful in airplane manufacture, where strength and lightness are desired.

Articles made from vulcanized fiber and then dried, may be finished by covering with a waterproof varnish.

I claim as my invention:

1. The method of forming a structural piece from vulcanized fiber which consists in shaping the piece to approximate form while the stock is in a soft state, slitting the edges of said piece parallel to the plane of its sides, turning the parted edges outwardly to form flanges and holding the piece thus shaped under pressure until it has hardened and set.

2. The method of forming structural pieces from vulcanized fiber which consists in shaping the piece to approximate form while the stock is in a soft state, slitting the edges of said piece longitudinally of its length, turning the slitted edges outwardly to form flanges and holding the piece thus shaped under pressure until it has hardened and set.

3. A structural piece formed of vulcanized fibre, comprising a web having its edges slitted and bent outwardly to form flanges on opposite sides of the web, said web and flanges being integral and being hardened by drying in a fixture.

Signed at Hartford, Conn. this 15th day of April 1921.

WILLIAM A. LORENZ.